March 3, 1936.  E. G. BARNES  2,032,969
ADJUSTABLE JACK POST BEARING AND BELT TIGHTENER
Filed Nov. 6, 1933  2 Sheets-Sheet 1
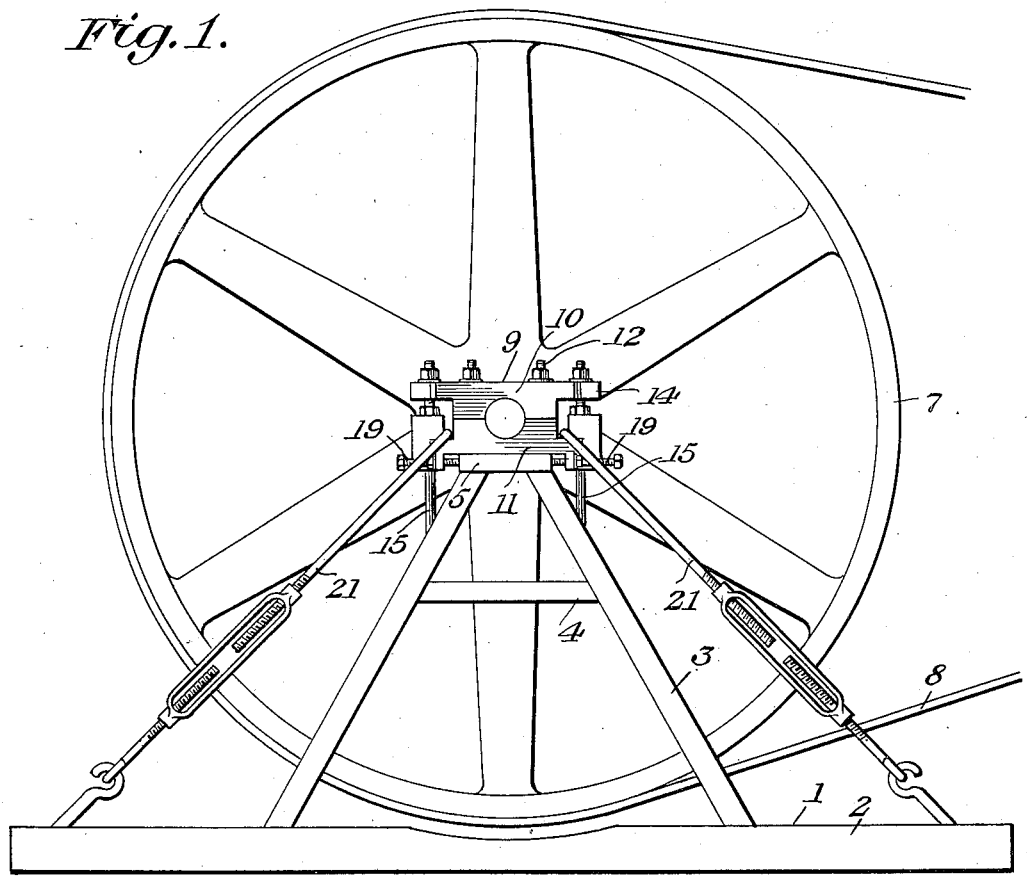
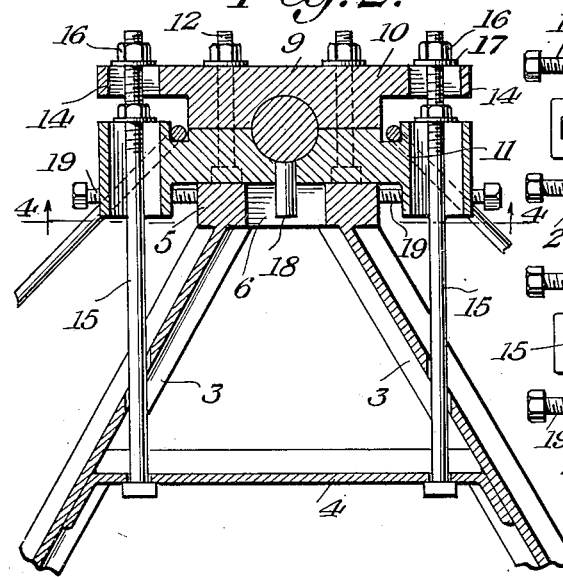
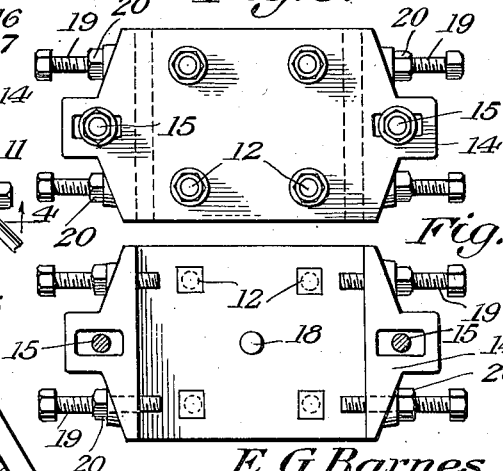
E. G. Barnes
INVENTOR
BY Victor J. Evans & Co.
ATTORNEYS March 3, 1936.　　　　E. G. BARNES　　　　2,032,969
ADJUSTABLE JACK POST BEARING AND BELT TIGHTENER
Filed Nov. 6, 1933　　　2 Sheets-Sheet 2
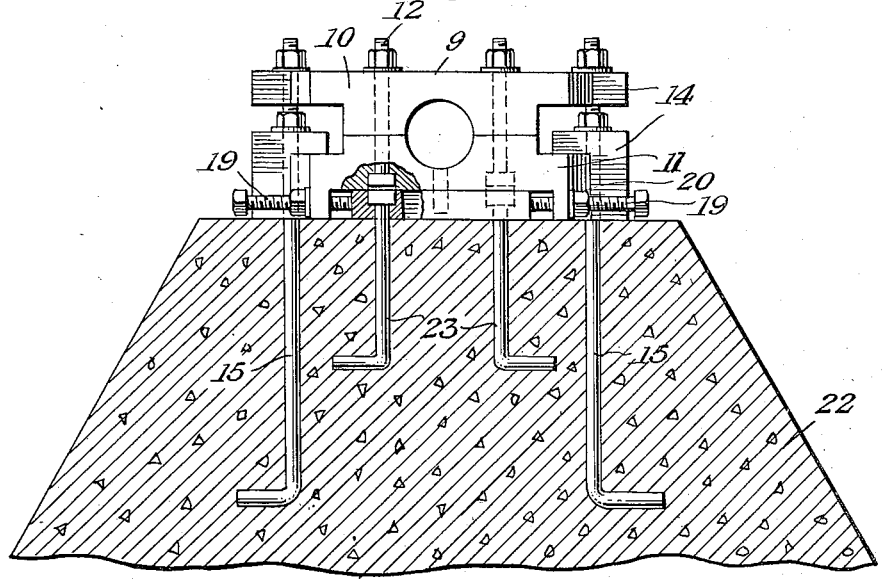
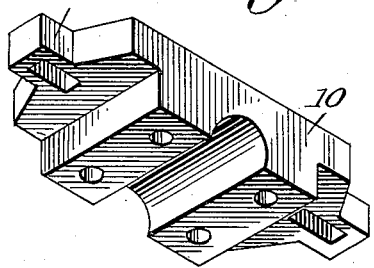
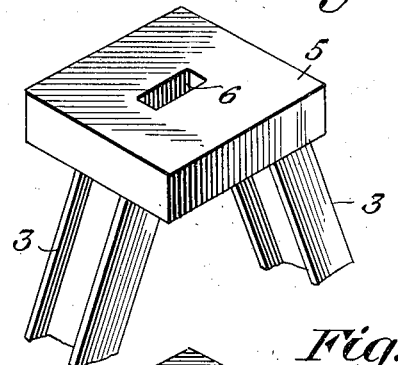
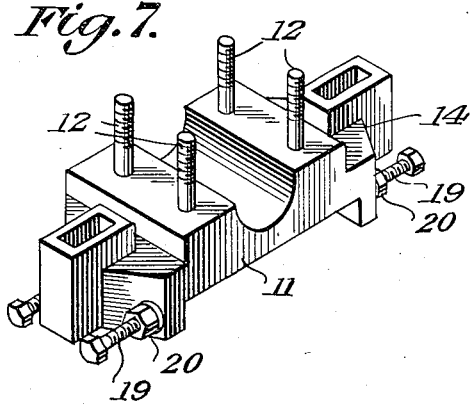
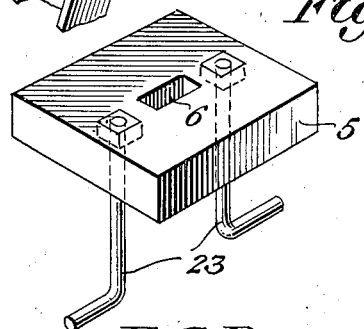
E. G. Barnes
INVENTOR
BY Victor J. Evans & Co.
ATTORNEYS Patented Mar. 3, 1936

2,032,969

UNITED STATES PATENT OFFICE 2,032,969

ADJUSTABLE JACK POST BEARING AND BELT TIGHTENER

Edmond G. Barnes, Big Springs, Tex.

Application November 6, 1933, Serial No. 696,901

1 Claim. (Cl. 74—242.14)

This invention relates to jack post bearings and has for the primary object the provision of a means for adjustably connecting a bearing to a jack post either of metallic or concrete construction whereby a band wheel may be easily and quickly aligned with the drive medium and the slack removed from the drive belt employed between said band wheel and the drive medium.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a jack post and band wheel with a bearing constructed in accordance with my invention.

Figure 2 is a fragmentary vertical sectional view illustrating the mounting of the bearing to the jack post so that said bearing may be adjusted relative to the post.

Figure 3 is a top plan view of the bearing.

Figure 4 is a bottom plan view of the bearing.

Figure 5 is a fragmentary side elevation partly in section illustrating the bearing mounted to a jack post of concrete construction.

Figure 6 is a perspective view illustrating the upper section of the bearing.

Figure 7 is a similar view illustrating the lower section of the bearing.

Figure 8 is a fragmentary perspective view illustrating a portion of a metallic jack post.

Figure 9 is a perspective view illustrating an attaching plate and the means of anchoring the same to a jack post of concrete construction.

Referring in detail to the drawings, the numeral 1 indicates a jack post of metallic construction having rising from the base 2 thereof the converging legs or supports 3 connected by a brace 4 and carrying an attaching or rest plate 5 provided with an elongated slot 6. The band wheel 7 is shown driven by the usual belt 8 and supported to the jack post by a bearing 9 forming the subject matter of the present invention.

The bearing 9 includes upper and lower sections 10 and 11 adjustably and detachably connected by bolts 12. The bearing sections receive therebetween the axle of the band wheel 7. Socket extensions 14 having elongated slots therethrough are formed integrally with the opposite ends of the upper and lower bearing sections for the purpose of receiving tie rods 15 suitably connected to the brace 4 of the jack post. It is also to be noted that the tie rods extend through slots in the uprights 3 and said tie rods have threaded therethrough nuts 16 engaging washers 17 that are brought in contact with the outer faces of the sockets 14 on the respective upper and lower bearing sections 10 and 11. The lower section 11 carries a centering pin 18 which extends into the slot 6 of the rest or support 5. The extensions 14 of the lower sections 11 depend below the latter and have extending therethrough adjusting bolts 19 adapted to bear against opposite sides of the rest or support 5. Nuts 20 are threaded to the adjusting bolts and bear against the extensions of the lower bearing section whereby the bearing 9 may be adjusted upon the support or rest 5 for the purpose of aligning the band wheel 7 with the driving medium and also to remove slack from the drive belt 8.

Adjustable tie rods 21 extend between the bearing 9 and the base 2 of the jack post 1. A device constructed in accordance with the foregoing will permit adjustment of the band wheel 7 to be easily and quickly accomplished by a single person.

To employ the bearing 9 to a jack post 22 of concrete construction, the rest or plate 5 is provided with anchoring rods 23 embedded in the concrete. The tie rods 15 are also embedded in the concrete of the jack post. Thus it will be seen that the present invention is easily applicable to several types of jack posts.

While I have shown and described the preferred embodiment of my invention, it will be understood that minor changes in construction, combination and arrangement of parts may be made without departing from the spirit and scope of my invention, as claimed.

Having described the invention, I claim:

A combined bearing and belt tightening device for the shaft of a belt wheel, comprising in combination, a horizontal support having a fixed rest plate thereon and having fixed tie rods arising therefrom at the sides of the rest plate, said bearing resting on the rest plate and comprising an upper and a lower section and means for connecting the sections, each of said sections having socket extensions which are provided with elongated slots through which the tie rods pass and nuts screwed on the tie rods and contacting with the outer faces of the sockets on the respective upper and lower bearing sections, and with adjusting bolts on the lower bearing sections contacting the opposite ends of the rest plate.

EDMOND G. BARNES.